United States Patent
Rosenof et al.

(10) Patent No.: US 7,333,861 B2
(45) Date of Patent: Feb. 19, 2008

(54) METHOD AND SYSTEM FOR CALCULATING MARGINAL COST CURVES USING PLANT CONTROL MODELS

(75) Inventors: Howard Rosenof, Newton, MA (US); W. Curt Lefebvre, Boston, MA (US); Daniel W. Kohn, Cambridge, MA (US); Peter Spinney, Jamaica Plain, MA (US)

(73) Assignee: NeuCo, Inc., Boston, MA (US)

( * ) Notice: Subject to any disclaimer, the term of this patent is extended or adjusted under 35 U.S.C. 154(b) by 112 days.

(21) Appl. No.: 11/257,543

(22) Filed: Oct. 25, 2005

(65) Prior Publication Data

US 2006/0089730 A1 Apr. 27, 2006

Related U.S. Application Data

(60) Provisional application No. 60/621,820, filed on Oct. 25, 2004.

(51) Int. Cl.
*G05B 13/02* (2006.01)
*G05B 19/418* (2006.01)
*F02C 9/00* (2006.01)
*F02C 6/00* (2006.01)
*F02G 1/00* (2006.01)
*F02G 3/00* (2006.01)
*G05D 5/00* (2006.01)
*G05B 15/00* (2006.01)
*G05B 19/18* (2006.01)

(52) U.S. Cl. .................. 700/36; 60/39.182; 60/773; 705/8; 700/291; 700/286

(58) Field of Classification Search ............. 700/36, 700/49, 291; 60/39.182; 706/3; 705/8
See application file for complete search history.

(56) References Cited

U.S. PATENT DOCUMENTS 4,965,742 A 10/1990 Skeirik (Continued)

OTHER PUBLICATIONS

"Marginal cost", wikipedia, (http://en.wikipedia.org/wiki/Marginal_cost).*

(Continued)

*Primary Examiner*—Anthony Knight
*Assistant Examiner*—Sunray Chang
(74) *Attorney, Agent, or Firm*—Kusner & Jaffe

(57) ABSTRACT

A method and system are provided for calculating a marginal cost curve for a plant at a plant load range comprising a plurality of specified plant loads. The method includes providing a model used for controlling the plant. The model relates plant load and one or more given cost contributing factors. The marginal value for each of the one or more given cost contributing factors at each of the plurality of specified plant loads is determined using the model. A variable cost at each of the plurality of specified plant loads is determined by: (i) multiplying the marginal value of each of the one or more given cost contributing factors at each of the plurality of specified plant loads by a respective unit cost of each of the one or more given cost contributing factors, and (ii) if there are a plurality of given cost contributing factors, summing the results of (i) at each of the plurality of specified plant loads. A marginal variable cost is determined at each of the plurality of specified plant loads by computing a derivative of the variable cost at each of the plurality of specified plant loads. A collection of marginal variable costs at the plurality of specified plant loads defines the marginal cost curve for the plant at the plant load range.

27 Claims, 1 Drawing Sheet

U.S. PATENT DOCUMENTS

| | | | |
|---|---|---|---|
| 4,985,824 A | 1/1991 | Husseiny et al. | |
| 5,167,009 A | 11/1992 | Skeirik | |
| 5,212,765 A | 5/1993 | Skeirik | |
| 5,224,203 A | 6/1993 | Skeirik | |
| 5,282,261 A | 1/1994 | Skeirik | |
| 5,386,373 A | 1/1995 | Keeler et al. | |
| 5,471,381 A | 11/1995 | Khan | |
| 5,493,631 A | 2/1996 | Huang et al. | |
| 5,704,011 A | 12/1997 | Hansen et al. | |
| 5,781,432 A | 7/1998 | Keeler et al. | |
| 5,819,246 A | 10/1998 | Ashida et al. | |
| 5,822,740 A | 10/1998 | Haissig et al. | |
| 6,002,839 A | 12/1999 | Keeler et al. | |
| 6,038,540 A * | 3/2000 | Krist et al. | 705/8 |
| 6,063,292 A | 5/2000 | Leung | |
| 6,230,480 B1 * | 5/2001 | Rollins, III | 60/39.182 |
| 6,241,435 B1 | 6/2001 | Huang et al. | |
| 6,243,696 B1 | 6/2001 | Keeler et al. | |
| 6,325,025 B1 | 12/2001 | Perrone | |
| 6,425,352 B2 | 7/2002 | Perrone | |
| 6,494,045 B2 * | 12/2002 | Rollins, III | 60/773 |
| 6,532,454 B1 | 3/2003 | Werbos | |
| 6,539,343 B2 | 3/2003 | Zhao et al. | |
| 6,583,694 B2 | 6/2003 | Comtois et al. | |
| 6,606,848 B1 * | 8/2003 | Rollins, III | 60/39.182 |
| 6,668,201 B1 | 12/2003 | Bonissone et al. | |
| 6,721,606 B1 | 4/2004 | Kaji et al. | |
| 6,725,208 B1 | 4/2004 | Hartman et al. | |
| 6,736,089 B1 | 5/2004 | Lefebvre et al. | |
| 6,745,109 B2 * | 6/2004 | Kojima et al. | 700/291 |
| 6,757,579 B1 | 6/2004 | Pasadyn | |
| 6,792,759 B2 * | 9/2004 | Rollins, III | 60/773 |
| 6,823,675 B2 | 11/2004 | Brunell et al. | |
| 7,131,259 B2 * | 11/2006 | Rollins, III | 60/39.182 |
| 2003/0109951 A1 | 6/2003 | Hsiung et al. | |
| 2003/0190603 A1 | 10/2003 | Larder et al. | |
| 2003/0195641 A1 | 10/2003 | Wojsznis et al. | |
| 2003/0217021 A1 | 11/2003 | Jacobson | |
| 2004/0133531 A1 | 7/2004 | Chen et al. | |
| 2004/0170441 A1 | 9/2004 | Forbes et al. | |

OTHER PUBLICATIONS

"Electricity Prising in a Competitive Enviroment: Marginal Cost Prising of Generation Services and Financial Status of Electric Utilities", DOE/EIA-0614, Aug. 1997, U.S. Department of Energe.*

"Lagrange Multipliers", wikipedia, (http://en.wikipedia.org/wiki/Lagrange_multipliers).*

* cited by examiner

METHOD AND SYSTEM FOR CALCULATING MARGINAL COST CURVES USING PLANT CONTROL MODELS

RELATED APPLICATION

The present invention is based on and claims priority from U.S. Provisional Patent Application Ser. No. 60/621,820 filed on Oct. 25, 2004 and entitled METHOD AND SYSTEM FOR CALCULATING MARGINAL COST CURVES AND OPTIMIZING ASSET DISPATCH, which is incorporated herein by reference in its entirety.

FIELD OF THE INVENTION

The present invention relates generally to increasing the efficiency and effectiveness of the dispatch of assets such as electricity producing assets and, more particularly, to calculating Marginal Cost Curves (MCC) from available plant data.

BACKGROUND OF THE INVENTION

Within the electric power industry, Variable Cost can be defined as a power producing unit's instantaneous combined hourly cost for fuel and for emissions credits (buying or selling of). Marginal Variable Cost (MVC) can be defined as the change in Variable Cost that is caused by a small change in electric output for sale (export generation) under current or specified operating conditions. Thus, Marginal Variable Cost may be considered the slope of the curve showing variable cost vs. electrical output for current or specified operating conditions, evaluated at a power producing plant's current or specified electrical output.

The evaluation of Marginal Variable Cost (to create a Marginal Cost Curve (MCC)) can be treated as a steady state problem, wherein dynamic operating costs (such as increased NOx and fuel consumption while ramping), increases in depreciation charges (due to reduction in equipment lifetimes caused by thermal cycling of fast ramping), and contractual risk (the increased likelihood, due to ramping, that a forced outage would necessitate the purchase of replacement power) are ignored. Under this approximation, the cost of operating the power producing unit assumes that the unit is under steady state operation. However, it does not assume that the outside world is under steady state. In particular, there are factors external to the unit itself that can impact the unit's Marginal Variable Cost, such as the unit cost of coal or of NOx or SOx emissions. These factors, though dynamic, can be updated and factored into the evaluation of the Unit Marginal Variable Cost at a real time rate.

The marginal variable cost of a power plant (or unit within a plant) is a measure of the operational cost of producing a given increment to the power needed from the plant. One use of the MVC or the derived MCC is that it allows power producers to compare the cost of power production amongst their various facilities. This comparison is important because it enables a power producer to operate at a lowest cost to themselves and/or to their customers. For instance, when the power demand on a producer is anything other than their own full capacity, the producer can generate power starting with their lowest cost units and working up.

The MVC and MCC of individual power producers are also used by a variety of regulatory organizations within the power industry. The power industry can be broadly classified by three functions: power production, power transmission, and power distribution. The regulations, methods, and organizations that surround these functions have undergone a large amount of change in recent years in the U.S. Consequently, the manner in which the MVC and MCC are used is also undergoing change.

At present in the U.S., about 50% percent of the power that is produced is dispatched and transmitted via the use of an Independent System Operator (ISO) using Locational Marginal Pricing (LMP). LMP is a mechanism by which the ISO can ascribe reasonable and competitive sell and purchase prices for power producer and power distribution entities respectively. The LMP is defined as the sum of the MVC (or MCC), the Congestion Cost, and the Losses Cost. Power producers will bid to provide power for transmission based on the profit margin between their estimated actual LMP and the predicted actual LMP expected to be provided by the ISO. In the current marketplace, the MVC has a large variability and a significant impact on the LMP. MVC can range from about 15 to 100 $/MWh, Congestion Costs can range from about −20 to 150 $/MWh, and Losses Cost can range from about 3 to 8 $/MWh. A simple, accurate, reliable, and rapid mechanism for calculating the MVC or associated MCC is therefore desirable. The LMP method is gaining in popularity and is expected to be used for the pricing of about 75% of the power in the U.S. within the next year. The LMP method has been in practical operation for about 4 years in the U.S., even though the idea of the LMP as a method for pricing power is about 20 years old.

Prior to the advent of the LMP, power pricing was largely done using the Merit Order Dispatch (MOD) method. In MOD, each power producer supplies the MVC or MCC for each of their units to the regional Power Pool. The Power Pool organized each of the units according to the value of the MVC or MCC and then dispatched, or instructed each unit to produce a certain load, starting with the lowest cost producer and working up towards the more expensive producers, until the total required load was achieved. This method was more common in the U.S. when power distribution, transmission, and production were government regulated, integrated utilities provided all of the three functions described above within their franchise areas, and when the cost of the power was more directly passed to the consumer. The MOD method, however, is still in use in regulated areas of the U.S. and still benefits from accurate and reliable MCC or MVC evaluation.

BRIEF SUMMARY OF EMBODIMENTS OF THE INVENTION

A method and system are provided for calculating a marginal cost curve for a plant at a plant load range comprising a plurality of specified plant loads. The method includes providing a model used for controlling the plant. The model relates plant load and one or more given cost contributing factors. The marginal value for each of the one or more given cost contributing factors at each of the plurality of specified plant loads is determined using the model. A variable cost at each of the plurality of specified plant loads is determined by: (i) multiplying the marginal value of each of the one or more given cost contributing factors at each of the plurality of specified plant loads by a respective unit cost of each of the one or more given cost contributing factors, and (ii) if there are a plurality of given cost contributing factors, summing the results of (i) at each of the plurality of specified plant loads. A marginal variable cost is determined at each of the plurality of specified plant loads by computing a derivative of the variable cost at each of the plurality of specified plant loads. A collection of marginal variable costs at the plurality of specified plant loads defines the marginal cost curve for the plant at the plant load range.

These and other features and advantages of the present invention will become readily apparent from the following detailed description, wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF PREFERRED EMBODIMENTS OF THE INVENTION

Figure 1:
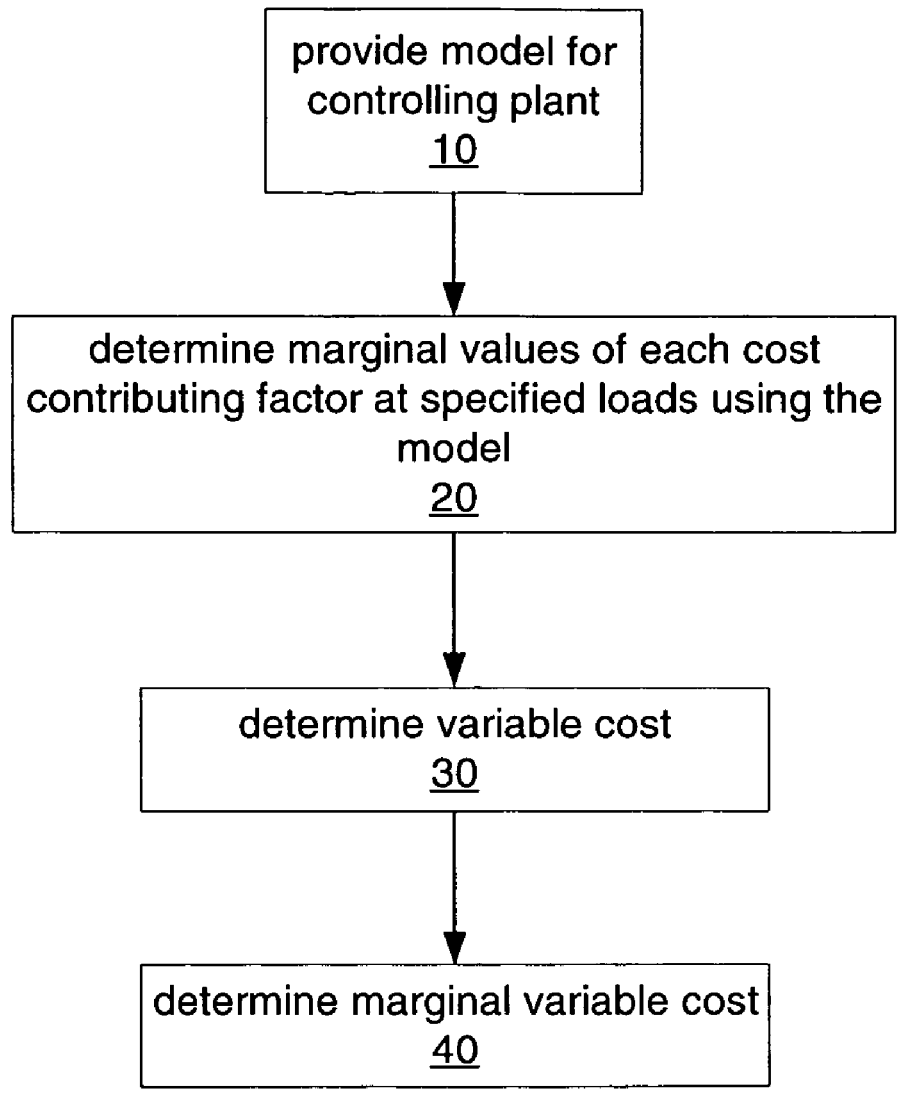
FIG. 1 is a flow chart generally illustrating a method of calculating a marginal cost curve in accordance with one or more embodiments of the invention.

The present application is generally directed to methods and systems for calculating a marginal cost curve for a plant at a plant load range comprising a plurality of specified plant loads. FIG. 1 generally illustrates a method of calculating a marginal cost curve in accordance with one or more embodiments of the invention.

At step 10, a model used for controlling the plant is provided. The model relates plant load (which can, e.g., be the electric power output of a plant if the plant is a power producing plant) and one or more given cost contributing factors. The cost contributing factors can include consumables costs (such as, e.g., fuel, reagents, and sorbents), emissions (such as, e.g., NOx and Sox) allowance costs, or plant depreciation or maintenance costs.

At step 20, the marginal value for each of the one or more given cost contributing factors at each of the plurality of specified plant loads is determined using the model.

At step 30, the variable cost at each of the plurality of specified plant loads is determined by: (i) multiplying the marginal value of each of the one or more given cost contributing factors at each of the plurality of specified plant loads by a respective unit cost of each of the one or more given cost contributing factors, and (ii) if there are a plurality of given cost contributing factors, summing the results of (i) at each of the plurality of specified plant loads.

At step 40, the marginal variable cost at each of the plurality of specified plant loads is determined by computing a derivative of the variable cost at each of the plurality of specified plant loads. The collection of marginal variable costs at the plurality of specified plant loads defines the marginal cost curve for the plant at the plant load range.

One or more embodiments of the invention particularly utilizes available plant and unit level control models in calculating MCC information. As described elsewhere (e.g., in U.S. Pat. No. 6,736,089, which is directed to controlling sootblower operation in a boiler, and is expressly incorporated by reference herein in its entirety), models of the outputs from a plant may be used to control the outputs if the input variables to the model include manipulatable variables whose adjustments influence and are highly correlated with the outputs. Such plant, or indirect, models may also contain state variables as input. These models are multidimensional, meaning that there is more than one input variable used to estimate or predict a model output. An example of such a model might be one that has three inputs (fuel bias, air bias, and unit load) and one output (NOx). Fuel bias and air bias are manipulated variables. Unit load is typically a state variable, because that variable is typically not treated as manipulated for the purpose of NOx management. In accordance with one or more embodiments of the invention, load can be treated as a manipulated variable. Models, such as, e.g., neural networks and others may have one or many outputs. The model described above has one output, NOx, though the following description applies equally to a model with many outputs.

In one or more embodiments, existing multidimensional plant control models are used to automatically provide a one-dimensional model that is a subset of the information provided by the multidimensional model. In certain embodiments, the one-dimensional model is a model that illustrates the amount of NOx output by the unit or plant as a function of load, starting at its current load and looking to higher or lower possible loads. In certain embodiments, the one-dimensional model is a model that illustrates the fuel consumption of the unit or plant as a function of load, starting at its current load and looking to higher or lower possible loads. In certain embodiments, the one-dimensional model is a model that illustrates the amount of any other plant byproduct (such as opacity or $SO_2$ gas or maintenance activities etc., which have a cost to the unit or plant) as a function of load, starting at its current load and looking to higher or lower possible loads.

In certain embodiments, the one-dimensional NOx (or other variable) vs. load model may be manipulated to provide a marginal variable cost curve. The marginal variable cost may be computed by multiplying the marginal amount of NOx production (or other output or byproduct) at any load by the cost or credit value of a unit of NOx (or other output or byproduct) produced.

In certain embodiments multiple models or a single model with multiple outputs may be used to create multiple components of a marginal variable cost curve. For instance, the model described above for NOx could be combined with a model for coal consumption to give a marginal cost curve for the unit that contained both the cost of emission and the cost of coal consumed to produce the electricity. Expanding on the description of the single output case above, each output would need to be multiplied by the appropriate unit cost of that modeled amount in order to evaluate the cost of both emission and coal. In this example, the coal consumption model would also need to have load as an input variable, though it need not share any of the other input variables with the NOx model, and the coal consumption value would need to be multiplied by the unit cost of coal. In certain embodiments, a single model with multiple outputs may be used to create the multiple components of the marginal cost. For instance, a single neural network that contains both a modeled NOx and a modeled coal consumption output can be used to calculate the marginal cost by multiplying each output at a certain load by the associated cost factor and then summing. In certain embodiments, neural networks can be used to model NOx or other variables. In certain embodiments, genetic algorithms or first principle modeling methods can be used to model NOx or other variables. Modeling methods are described in further detail below.

One advantageous feature of one or more embodiments is the ability to use available emissions or efficiency models, which are accurate over a timescale of hours to weeks, in conjunction with cost coefficients values, which are accurate over a timescale of minutes to days. In particular, adaptive plant models reflect the relatively slowly changing relationships between state or manipulated variables and control variables such as NOx or fuel consumption. But the cost coefficients that are folded into the MCC calculation may be a function of electricity supply and demand, the spot price for oil or gas, or the buying and selling of emissions allowances on an open market, and therefore fluctuate on a faster, minute or hourly, basis. Because the cost coefficients fluctuate on a relatively fast basis, they cannot be folded into the control models. Also, it is generally desirable that the plant control models, NOx or other, can be evaluated independently from cost models.

In general, the cost coefficients may be assumed to have a fast time constant, though there may be both fast and slow time contributions. For instance, NOx credit costs in a geographical region may be constant over an entire Ozone Season or they may vary on a daily basis in a dynamic regional market. Likewise, the fuel costs of a plant may be constant, by way of example, for the weeklong period during which a plant is burning a load of coal; or they may vary on a daily basis in a dynamic, regional gas market. Other cost factors, such as Locational Marginal Pricing, always have a fast time constant due to the market-based nature of their evaluation. Various embodiments of the present invention decouple the cost coefficients contributions to the MCC from the slow time constant contributions. The slow time constant contributions benefit in accuracy by having longer training and retuning periods. The fast time constant contributions benefit in accuracy by accounting for real time market information.

In the electric power industry, the MCC can be defined as the cost of producing some additional amount of power (e.g., 1 MW or greater). The cost of producing that power is the sum of individual costs such as NOx credit, fuel, SOx credits, etc. Each of the cost terms may be evaluated by multiplying the quantity of the entity by its unit cost. The MCC, which is therefore the sum of the products of pairs of slow and fast terms, benefits in accuracy as a result of the decoupling method described. The current invention is able to evaluate the real time MCC more accurately than a system that does not decouple contributions from multiple time scales.

The method described above for independently evaluating slow and fast time constant terms, where the slow time constant terms may include plant model output, and the fast time constant term may include market value of the outputs, is of general applicability for quantities other than the MCC described above by way of example.

Multiple numerical methods for evaluation of the composite functions described above are possible. The methods described below are given by way of example and not limitation. One such method is to evaluate the 'j'th output of a neural network model, Y, which is a function F of 'i' input variables X, at multiple points, a to b, along a single dimension while the values of all other input dimensions, Xi, are assumed to stay fixed at the current values, namely those values true at the time of model evaluation. The resulting set of points [Xi(a):Xi(b), Yj(Xi(a)):Yj(Xi(b))] constitutes the two dimensional curve whose Yj value is to be multiplied by the real time cost coefficient. Another method is to evaluate the 'j'th output of different neural network models, where j may be an integer greater than or equal to 1, in order to derive multiple sets of points [Xi(a):Xi(b), Yj(Xi(a)):Yj(Xi(b))], the Yj of each are to be multiplied by their corresponding cost coefficient and summed to give the final MCC. Another method involves the similar evaluation to determine [Xi(a):Xi(b), Yj(Xi(a)):Yj(Xi(b))] for some other type of model, such as a genetic algorithm, regression, or a first principles model. In this method, the Yj value is also to be multiplied by the appropriate real time cost coefficient. In one method, real time values for cost coefficients are taken from available market sources, such as an Internet site provided by a trading organization or a supplier or a government organization, etc. In one method, cost coefficient values are calculated from available data. In one method the 'j'th output of a neural network model, Y, which is a function F of 'i' input variables X, at some point of interest 'c', which lies within a range of interest 'a' to 'b', along a single dimension is evaluated by taking the partial derivative of Yj at Xi(c) and using that slope, in conjunction with Yj(Xi(c)) to evaluate Yj over the range Xi(a):Xi(b). The Yj from the resulting set of points [Xi(a):Xi(b), Yj(Xi(a)):Yj(Xi(b))] are then multiplied by their corresponding cost coefficients to give the final MCC.

One or more embodiments are particularly directed to a method and device for calculating the true Marginal Variable Cost at an electric power plant. In one embodiment, multidimensional neural network models are used to evaluate the cost of production of electricity at current and possible future unit load production levels. In one embodiment, multidimensional first principle models are used to evaluate the cost of production of electricity at current and possible future unit load production levels. In one embodiment, current and possible future unit load production levels are used to evaluate the Marginal Variable Cost value for electricity production at the unit. In one embodiment, current and possible future unit load production levels are used to evaluate the Incremental Cost of energy production integrated from current load to some future load. In one embodiment, the sensitivity of multiple individual models of individual cost contributing factors, such as NOx and SOx (emission levels), fuel consumption, maintenance costs, etc., is automatically evaluated to changes in load (from the current load to a desired load). In some embodiments, the product of the modeled cost contributing factor and the unit cost of that modeled factor and sums those terms to provide the total Marginal Variable Cost curve is evaluated. In some embodiments, the Marginal Variable Cost curve is used to evaluate the net Incremental Cost.

Various methods for modeling plant output or byproducts are discussed in further detail below. The models described may be used for plant optimization or improvement of efficiency, output, or byproducts. In such applications, the models are frequently used in conjunction with a controller.

Models can capture steady state or dynamic information. A physical plant, such as boiler, is a dynamic system, namely, it includes materials and/or components that have response times due to applied mechanical, chemical, and other forces. Changes made to control variables or to the state of the boiler are, therefore, usually accompanied by oscillations or other movements that reflect the fast time-dependent nature and coupling of the variables. During steady state operation or control, the boiler reaches an equilibrium state such that a certain set or sets of control variable settings enable maintenance of a fixed and stable plant output of a variable such as megawatt power production. Typically, however, a boiler operates and is controlled in a dynamic mode. During dynamic operation or control, the boiler is driven to achieve an output that differs from its current value. In certain embodiments, the model and/or controller is dynamic. In general, dynamic models and controllers include information about the trajectory nature of the plant states and variables. In some embodiments, models and controllers can also be steady-state used to control a dynamic operation, in which case the dynamic aspects of the plant are ignored in the control and there is a certain lag time expected for the plant to settle to steady state after the initial process control movements.

In accordance with one or more embodiments of the invention, three general classes of modeling methods can be used for the construction of direct (i.e., one that does not use a system model) and indirect (i.e., one that does use a system model or representation of the plant) controllers. One method is a strictly deductive, or predefined, method. A strictly deductive method uses a deductive architecture and a deductive parameter set. Examples of deductive architectures that use deductive parameter sets include parametric models with preset parameters such as first principle or other system of equations. Other strictly deductive methods can include preset control logic such as if-then-else statements, decision trees, or lookup tables whose logic, structure, and values do not change over time.

In accordance with one or more embodiments of the invention, the models and controllers are preferably adaptive, to capture the off-design or time-varying nature of the plant. A parametric adaptive modeling method can also be used in various embodiments. In parametric adaptive modeling methods, the architecture of the model or controller is deductive and the parameters are adaptive, i.e., are capable of changing over time in order to suit the particular needs of the control system. Examples of parametric adaptive modeling methods that can be used in some embodiments of the invention include regressions and neural networks. Neural networks are contemplated to be particularly advantageous for use in complex nonlinear plants. Many varieties of neural networks, incorporating a variety of methods of adaptation, can be used in embodiments of the present invention.

Another type of modeling method, strictly non-parametric, that can also be used in one or more embodiments of the invention uses an adaptive architecture and adaptive parameters. A strictly non-parametric method has no predefined architecture or sets of parameters or parameter values. One form of strictly non-parametric modeling suitable for use in one or more embodiments of the invention is evolutionary (or genetic) programming. Evolutionary programming involves the use of genetic algorithms to adapt both the model architecture and its parameters. Evolutionary programming uses initially random combinations of any set of mathematical or logical operations that are shaped by "evolution" to describe the control laws of a process.

In embodiments in which the controller is adaptive, it is preferably implemented on-line, or in a fully automated fashion that does not require human intervention. The particular adaptation methods that are applied are, in part, dependent upon the architecture and types of parameters of the controller. The adaptation methods used in one or more embodiments of the invention can incorporate a variety of types of cost functions, including supervised cost functions, unsupervised cost function and reinforcement based cost functions. Supervised cost functions include explicit boiler output data in the cost function, resulting in a model that maps any set of boiler input and state variables to the corresponding boiler output. Unsupervised cost functions require that no plant output data be used within the cost function. Unsupervised adaptation is primarily for cluster or distribution analysis.

One or more embodiments of the invention can use a variety of search rules that decide which of a large number of possible permutations should be calculated and compared to see if they result in an improved cost function output during training or adaptation of the model. In one or more embodiments, the search rule used may be a zero-order, first-order or second-order rule, including combinations thereof. It is preferred that the search rule be computationally efficient for the type of model being used and result in global optimization of the cost function, as opposed to mere local optimization. A zero-order search algorithm does not use derivative information and may be preferred when the search space is relatively small. One example of a zero-order search algorithm useful in embodiments of the invention is a genetic algorithm that applies genetic operators such as mutation and crossover to evolve best solutions from a population of available solutions. After each generation of genetic operator, the cost function may be reevaluated and the system investigated to determine whether optimization criteria have been met. While the genetic algorithms may be used as search rules to adapt any type of model parameters, they are typically used in evolutionary programming for non-parametric modeling.

A first-order search uses first-order model derivative information to move model parameter values in a concerted fashion towards the extrema by simply moving along the gradient or steepest portion of the cost function surface. First-order search algorithms are prone to rapid convergence towards local extrema, and it is generally preferable to combine a first-order algorithm with other search methods to provide a measure of global certainty. In some embodiments of the invention, first-order searching is used in neural network implementation. A second-order search algorithm utilizes zero, first, and second-order derivative information.

In one or more embodiments of the invention, the controller is generated in accordance with the control variables available for manipulation and the types of boiler performance objectives defined for the plant. Control variables can be directly manipulated in order to achieve the control objectives, e.g., reduce $NO_x$ output. As discussed above, in certain embodiments, the operating parameters are control variables that the controller manages directly in accordance with the overall boiler objectives. Significant performance parameters may include, e.g., emissions ($NO_x$), fuel consumption, opacity, and capacity. The fuel consumption or NOx output may be the primary performance factor that the plant optimization system is designed to regulate. Desired objectives for the performance parameters may be entered into the controller, such as by an operator, or may be built into the controller. The desired objectives may include specific values, e.g., for emissions, or more general objectives, e.g., generally minimizing a particular performance parameter or maintaining a particular range for a parameter. Selecting values or general objectives for performance parameters may be significantly easier initially than determining the corresponding Y operating settings for attaining those performance values. Desired values or objectives for performance parameters are generally known beforehand, and may be dictated by external requirements. For example, for the heat rate, a specific maximum acceptable level may be provided to the controller, or the controller may be instructed to minimize the heat rate.

In one or more embodiments, the controller is formed of a neural network, using a reinforcement generator to initially learn and subsequently adapt to the changing relationships between the control variables, in particular, the plant operating parameters, and the acceptable and unacceptable overall objectives for the boiler. The rules incorporated in the reinforcement generator may be defined by a human expert, for example. The reinforcement generator identifies the boiler conditions as favorable or unfavorable according to pre-specified rules, which include data values such as NOx emission thresholds, stack opacity thresholds, CO emission thresholds, current plant load, etc. For example, the reinforcement generator identifies a set of sootblowing operating parameters as part of a vector that contains the favorable-unfavorable plant objective data, for a single point in time. This vector is provided by the reinforcement generator to the controller to be used as training data for the neural network. The training teaches the neural network to identify the relationship between any combination of plant operating parameters and corresponding favorable or unfavorable boiler conditions. In a preferred embodiment, the controller further includes an algorithm to identify the preferred values of the plant operating parameters, given the current values of the plant operating parameters, as well as a corresponding control sequence. In certain contemplated embodiments, the algorithm involves identifying the closest favorable boiler operating region to the current region and determining the specific adjustments to the plant operating parameters needed to move the boiler to that operating region. Multiple step-wise plant operating parameter adjustments may be required to attain the closest favorable boiler objective region due to rules regarding plant operating parameter allowable step-size or other constraints.

The methods for calculating marginal cost curves described herein are preferably implemented in software, and accordingly one of the preferred implementations of the invention is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention. For example, while several embodiments have been described in the context of the electric power industry, it should be understood that embodiments of the invention have broader applicability, e.g., to manufacturing and other industries.

Method claims set forth below having steps that are numbered or designated by letters should not be considered to be necessarily limited to the particular order in which the steps are recited.

The invention claimed is:

1. A method for dispatching electricity producing assets associated with an electric power producing plant at a plant load range comprising a plurality of specified plant loads, the method comprising:
(a) determining a marginal value for each of one or more given cost contributing factors at each of the plurality of specified plant loads using a model for controlling the electric power producing plant, the model relating plant load and one or more given cost contributing factors;
(b) determining a variable cost at each of the plurality of specified plant loads by:
(i) multiplying the marginal value of each of the one or more given cost contributing factors at each of the plurality of specified plant loads by a respective unit cost of each of the one or more given cost contributing factors, and
(ii) if there are a plurality of given cost contributing factors, summing the results of (i) at each of the plurality of specified plant loads;
(c) determining a marginal variable cost at each of the plurality of specified plant loads by computing a derivative of the variable cost at each of the plurality of specified plant loads;
(d) defining a marginal cost curve for the electric power producing plant at the plant load range using a collection of the marginal variable costs at the plurality of specified plant loads; and
(e) dispatching electricity producing assets associated with the electric power producing plant in accordance with the marginal cost curve for the electric power producing plant at the plant load range,
wherein said one or more given cost contributing factors include an emissions allowance cost comprising a $NO_x$ emission allowance cost or an $SO_x$ emission allowance cost.

2. The method of claim 1 wherein the one or more given cost contributing factors further include a consumables cost, or a plant depreciation or maintenance cost.

3. The method of claim 2 wherein the consumables cost comprises the cost of fuel, reagents or sorbents.

4. The method of claim 1 wherein the model is a fuel efficiency or plant emission model.

5. The method of claim 1 wherein the load is electric output of the plant.

6. The method of claim 1 wherein there are a plurality of cost contributing factors, and wherein the marginal values for the plurality of cost contributing factors are determined from multiple models or from multiple outputs of the model.

7. The method of claim 1 wherein the model comprises a neural network model, a genetic algorithm model, or a first principle model.

8. The method of claim 1 wherein the model is a one-dimensional model derived from a multi-dimensional plant control model.

9. The method of claim 1 further comprising obtaining the unit cost of each of the one or more given cost contributing factors in real time from a market source.

10. A computer program product for dispatching electricity producing assets associated with an electric power producing plant at a plant load range comprising a plurality of specified plant loads, the computer program product residing on a computer readable medium having a plurality of instructions stored thereon which, when executed by a processor, cause that processor to:
(a) determine a marginal value for each of one or more given cost contributing factors at each of the plurality of specified plant loads using a model used for controlling the electric power producing plant, the model relating plant load and one or more given cost contributing factors;
(b) determine a variable cost at each of the plurality of specified plant loads by:
(i) multiplying the marginal value of each of the one or more given cost contributing factors at each of the plurality of specified plant loads by a respective unit cost of each of the one or more given cost contributing factors, and (ii) if there are a plurality of given cost contributing factors, summing the results of (i) at each of the plurality of specified plant loads;

(c) determine a marginal variable cost at each of the plurality of specified plant loads by computing a derivative of the variable cost at each of the plurality of specified plant loads (d) define a marginal cost curve for the electric power producing plant at the plant load range using a collection of the marginal variable costs at the plurality of specified plant loads; and (e) dispatch assets associated with the electric power producing plant in accordance with the marginal cost curve for the electric power producing plant at the plant load range, wherein said one or more given cost contributing factors include an emissions allowance cost comprising a $NO_x$ emission allowance cost or an $SO_x$ emission allowance cost.

11. The computer program product of claim 10 wherein the one or more given cost contributing factors further include a consumables cost or a plant depreciation or maintenance cost.

12. The computer program product of claim 11 wherein the consumables cost comprises the cost of fuel, reagents or sorbents.

13. The computer program product of claim 10 wherein the model is a fuel efficiency or plant emission model.

14. The computer program product of claim 10 wherein the load is electric output of the plant.

15. The computer program product of claim 10 wherein there are a plurality of cost contributing factors, and wherein the marginal values for the plurality of cost contributing factors are determined from multiple models or from multiple outputs of the model.

16. The computer program product of claim 10 wherein the model comprises a neural network model, a genetic algorithm model, or a first principle model.

17. The computer program product of claim 10 wherein the model is a one-dimensional model derived from a multi-dimensional plant control model.

18. The computer program product of claim 10 wherein the processor further obtains the unit cost of each of the one or more given cost contributing factors in real time from a market source.

19. A system for dispatching electricity producing assets associated with an electric power producing plant at a plant load range comprising a plurality of specified plant loads, the system comprising:

a model for controlling the electric power producing plant, the model relating plant load and one or more given cost contributing factors;

means for determining a marginal value for each of the one or more given cost contributing factors at each of the plurality of specified plant loads using the model;

means for determining a variable cost at each of the plurality of specified plant loads by:

(i) multiplying the marginal value of each of the one or more given cost contributing factors at each of the plurality of specified plant loads by a respective unit cost of each of the one or more given cost contributing factors, and (ii) if there are a plurality of given cost contributing factors, summing the results of (i) at each of the plurality of specified plant loads;

means for determining a marginal variable cost at each of the plurality of specified plant loads by computing a derivative of the variable cost at each of the plurality of specified plant loads;

means for defining a marginal cost curve for the plant load range using a collection of the marginal variable costs at the plurality of specified plant loads; and means for dispatching electricity producing assets associated with the electric power producing plant in accordance with the marginal cost curve for the electric power producing plant at the plant load range, wherein said one or more given cost contributing factors include an emissions allowance cost comprising a $NO_x$ emission allowance cost or an $SO_x$ emission allowance cost.

20. The system of claim 19 wherein the one or more given cost contributing factors further include a consumables cost or a plant depreciation or maintenance cost.

21. The system of claim 20 wherein the consumables cost comprises the cost of fuel, reagents or sorbents.

22. The system of claim 19 wherein the model is a fuel efficiency or plant emission model.

23. The system of claim 19 wherein the load is electric output of the plant.

24. The system of claim 19 wherein there are a plurality of cost contributing factors, and wherein the marginal values for the plurality of cost contributing factors are determined from multiple models or from multiple outputs of the model.

25. The system of claim 19 wherein the model comprises a neural network model, a genetic algorithm model, or a first principle model.

26. The system of claim 19 wherein the model is a one-dimensional model derived from a multi-dimensional plant control model.

27. The system of claim 19 further comprising means for obtaining the unit cost of each of the one or more given cost contributing factors in real time from a market source.

* * * * *